June 20, 1967  R. L. ALLEN  3,326,091

BELLOWS

Filed Aug. 10, 1964

INVENTORS
ROBERT L. ALLEN, DECEASED
BY CARMEN S. ALLEN, EXECUTRIX

BY Newton, Hopkins & Jones
Attorneys

United States Patent Office 3,326,091
Patented June 20, 1967

3,326,091
BELLOWS
Robert L. Allen, deceased, late of Atlanta, Ga., by Carmen S. Allen, executrix, 240 Beverly Road NE., Atlanta, Ga. 30309
Filed Aug. 10, 1964, Ser. No. 388,724
3 Claims. (Cl. 92—34)

This invention relates to bellows and more particularly to a bellows, and a method of making a bellows, of one piece metal construction and having the desirable characteristics of a plate type of bellows.

A bellows is customarily of either the corrugated wall type or the plate type. The corrugated wall type of bellows is usually formed from a tubular blank and its convolutions are usually defined by parallel walls with each wall joined at its outer edge to an adjacent wall by a curved section and at its inner edge to an adjacent wall by a curved section.

The walls of each convolution are spaced apart when they are parallel and a corrugated wall type of bellows cannot be operatively collapsed to such an extent as to place the walls of its convolutions parallel and in contact. Thus, there are many requirements for a bellows which cannot be met by a corrugated wall type of bellows. Moreover, this type of bellows is frequently characterized by structural defects resulting from the working of the metal as the bellows is formed and by other limitations.

The plate type of bellows is usually formed by a plurality of plates which are welded, brazed or otherwise joined at their edges to adjacent plates to form the convolutions of the bellows. The plates of this type of bellows may be shaped and arranged to be substantially parallel and in contact with each other when the bellows is fully collapsed. However, regardless of plate shape, the joined edges of the plates define hinge lines about which the plates move with respect to each other as the bellows expands and collapses. It is at these hinge lines that the plate type of bellows tends to fail because the hinged motion of the plates weakens or destroys the joints formed at these hinge lines.

The walls of a corrugated wall type of bellows also tend to have angular or hinge-type motion and in both previous types of bellows, this motion frequently causes the metal of the bellows to change its characteristics. This causes the responsiveness of the bellows to change. Thus, previous bellows have not been characterized by long life and consistent response over a long period of use. The present invention substantially eliminates these and other limitations encountered with previous bellows.

The present invention provides an improved bellows by collapsing a simple corrugated tube which resembles a corrugated wall type of bellows. The tube is collapsed with the walls of the convolutions remaining substantially parallel to each other. Thus, the walls are not cold worked and remain flexible. However, the curved portions of the tube joining adjacent walls are squeezed and cold worked to form flattened inner and outer rings of work hardened metal joining the adjacent walls of the bellows.

The rings resemble the joined plate edges of a plate bellows and the bellows provided by the invention resembles a plate type bellows in appearance. However, unlike previous bellows of the plate type, the bellows of the invention is formed of a continuous piece of metal and avoids the inherent weakness associated with joining plates. Moreover, because the rings are cold worked, the rings are hardened and resist the hinge-like motion characteristic of bellows of the plate type. The degree to which the rings are hardened decreases as the rings extend to join the walls and the result is that the inner portions of the rings and the walls provide paired diaphragms which define convolutions and which flex with an S-like or ogee curvature as the bellows expands and collapses.

While it is among the general objects of the invention to provide a novel and improved one-piece metal bellows, it is more specifically an object of the present invention to provide a metallic bellows wherein upon movement of the bellows, the opposing diaphragms of each convolution are deformed in a regular uniform pattern throughout their area. Therewith a further object is to provide means for precluding a hinge-like change in the angular relation between the diaphragms of a pressure responsive or controlling bellows. It is also among the objects to provide a method of forming a metallic bellows of the type described whereby angular movement is resisted at those rings in which the diaphragms are joined. Another more general object of the invention is to provide a method of forming bellows by which long life and faithful response to applied pressure, or to applied mechanical force, is insured. The present invention further provides a bellows having the desirable characteristics of a plate type bellows but with hardened convolution edges to inhibit fracture or set from angular motion of the diaphragms. Numerous other objects, features and advantages of the invention will be apparent in consideration of the following specification taken in conjunction with the accompanying drawings in which:

Figure 1:
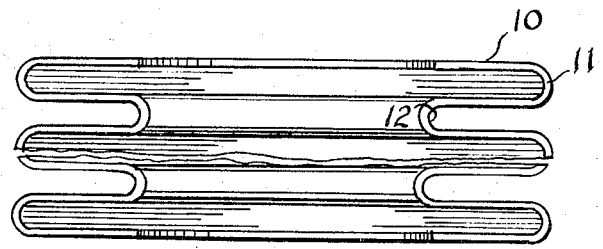
FIG. 1 is an enlarged fragmentary central sectional view of a corrugated metal tube from which the bellows of the present invention may be formed.

In the drawings, FIG. 1 illustrates generally the type of corrugated one-piece metal tubing or blank form of which the bellows of the present invention may be formed. The walls 10 of each convolution of the blank are flat and parallel and are joined at their outer edges by curved portions resembling substantially U-shaped return crest bends 11 and at their inner edges by similar curved portions resembling U-shaped valleys 12. It is to be noted that the bellows of the present invention are not limited as to the metal selected, its thickness or original characteristics as to physical properties. For the purposes of this present disclosure a thin copper or copper alloy of uniform crystalline grain structure and conventional ductility may be assumed. Diameters, either internal or external, are not critical nor is the length or the number of convolutions which may constitute the finished bellows. The figures of the drawings are therefore fragmentary and schematic depicting the fundamental inventive concept rather than illustrative of any one specific embodiment thereof. While the present drawings and description infer a bellows which is internally and externally circular, it will of course be understood that the concepts of the present invention are not necessarily limited to this configuration. Obviously other shapes may be utilized in forming the bellows of the present invention.

Figure 2:
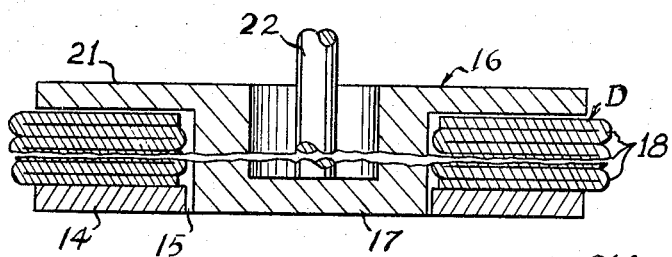
FIG. 2 is an enlarged vertical sectional view similar to FIG. 1 showing the tube of FIG. 1 fully compressed in the formation of the bellows of the present invention.

In the manufacture of the bellows of the present invention, a suitable length of blank stock of the type illustrated in FIG. 1 is compressed to the configuration of FIG. 2 in which the inner faces of the side walls 10 of each convolution are compressed into substantially parallel contact and the outer and inner crests 11 and valleys 12 of each convolution are deformed from the substantially U-shaped configuration as illustrated in FIG. 1 to the abrupt sharp return angle approaching 360 degrees as shown in FIG. 2. In forming the blank material in this manner, the ends of the blank are first cut at either a crest 11 or a valley 12 to provide a flat terminal area for the bellows by which its ends, after formation, may be appropriately joined with such structural elements (not shown) as may be desired.

As a convenient means for compression to form the present bellows there may be provided a supporting plate 14 defining an aperture 15 commensurate in diameter with the internal diameter of the finished bellows. The blank is then mounted on the base 14 in axial alignment with the aperture 15 and with its lower face surrounding the aperture 15. For compressing the bellows to the configuration illustrated in FIG. 2, there is provided a mandrel 16 with a head 17 conforming in size to the diameter of the aperture 15 so as to permit the head 17 of the mandrel 16 to pass through the aperture 15 as the mandrel is depressed in the compressional working of the blank. The upper end of the mandrel 16 is formed with an annular compressing flange 21 extending outwardly therefrom for a distance approximately equal to the width of the convolutions of the completely collapsed blank. A central operating rod 22 is provided extending upwardly and outwardly from the mandrel head 17 to provide manipulating means for the relative movement of the mandrel 16 with respect to the plate 14 in the collapsing of the blank.

A feature of the method by which the bellows of the present invention is formed is the subjection of the blank to low temperature annealing during the compression of the blank from the normal expanded configuration of FIG. 1 to the fully collapsed configuration of FIG. 2. The annealing may be achieved either by heating the blank when in position for compression to an annealing temperature and maintaining this temperature throughout the entire compressing operation or by heating the blank to an annealing temperature after each of a series of steps by which the blank is compressed. Regardless of whether the blank is constantly maintained at an annealing temperature or heated to an annealing temperature after each of a series of compressing steps, the annealing temperature selected is that known temperature which relieves the internal stresses in the metal of the blank while still permitting the metal to be hardened by cold working. Obviously different blanks will require different temperature ranges as determined by the particular metal used and by the preliminary treatment thereof before formation of the blank.

The single step collapsing of the bellows blank while the blank is at an annealing temperature may be accomplished by a rapid movement of the mandrel or its equivalent as by percussion. However, a steady, uniform and gradual application of pressure may be used. The step by step compression of the blank with heating to an annealing temperature after each step may be accomplished by step by step movement of the mandrel in any desired number of steps. It will be understood that any known convenient apparatus for heating a bellows to an annealing temperature may be used to anneal the bellows of the invention.

It will be understood that whether the bellows of the invention is collapsed in a single step or in a series of steps, the walls 10 of each convolution remain substantially parallel and are not cold worked. On the other hand, as the crests 11 and valleys 12 of the blank are deformed, the elastic limit of the metal in them is exceeded and these curved portions of the blank are cold worked to a substantial degree and hardened in known manner. The result is that after compression, the walls 10 are joined at their edges to adjacent walls by outer rings 18 and inner rings 19 of hardened metal.

These rings 18 and 19 have received less cold working in their inner portions because the deforming of the crests 11 and valleys 12 is most severe in those portions which become the edges of the rings 18 and 19. Accordingly, the rings 18 and 19 and the walls 10 form diaphragms D which are hardened at these inner and outer edges and become increasingly less hard and more flexible in those portions formed by the walls 10.

Figure 3:
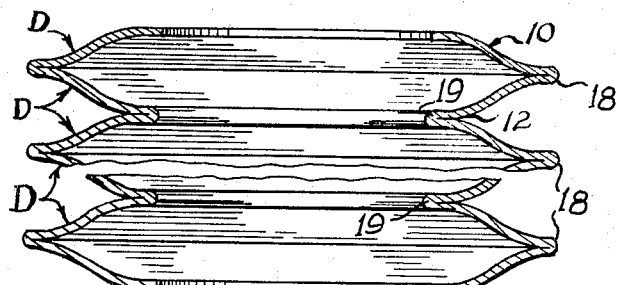
FIG. 3 is a sectional view of the bellows after compression as in FIG. 2 and after expansion beyond its elastic limit.

After compression as described above, the bellows is expanded beyond its elastic limit as graphically indicated at FIG. 3. As the bellows expands, each diaphragm D takes a shape which in section through the centerline of the diaphragm D resembles an S-curve or ogee. This occurs because the rings 18 and 19 are hardened and because of the manner in which the diaphragms D vary in flexibility between the rings 18 and 19.

Figure 4:
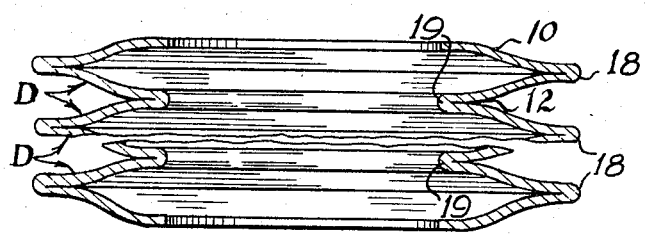
FIG. 4 illustrates the bellows of the present invention in fully relaxed position.

The stretching of the bellows beyond its elastic limit cold works the bellows in known manner to a degree just sufficient for the bellows to have a permanent set such as that indicated in FIG. 4. Moreover, the cold working of each wall 10 is greatest adjacent the rings 18 and 19 and decreases in extent inwardly from the rings 18 and 19. Thus, each diaphragm D is of maximum hardness and rigidity at its edges and progressively decreases inwardly in rigidity to provide a portion of maximum flexibility approximately equidistant from the edges. The bellows may be once again heated to a low annealing temperature to remove internal stresses. It will be understood that the working of the initial blank as described tends to eliminate any structure defects in the blank resulting from its resemblance to a corrugated wall type of bellows.

It will also be understood that in its relaxed state, each diaphragm D of the bellows still resembles an ogee in section through its centerline and that upon expansion or collapse of the bellows, the diaphragms D defining each convolution of the bellows simply flex between a position in which they are parallel and in contact and a position in which they resemble ogees having a steeper slope than that in the relaxed state of the bellows. It will also be understood that the diaphragms D flex in a uniform manner from outer ring 18 to inner ring 19 and that there is no hinge-like action tending to separate the diaphragms D or cause fatigue or set at the rings 18 and 19.

It will thus be seen that the bellows of the present invention formed by the method of the present invention is a bellows of uniform and consistent responsiveness and of long life without fracture or set. The hardening of the rings 18 and 19 because of severe cold working precludes a bending action or relative movement of any sort at the edges of the rings 18 and 19 and serves to avoid a critical point of stress at which fracture or set would normally take place. As indicated, the size, length, shape, diameter, width of convolutions or number of convolutions is not critical.

It will be obvious to those skilled in the art that many variations may be made in the embodiments chosen for the purpose of illustrating the present invention without departing from the scope thereof as defined by the appended claims.

What is claimed as invention is:

1. A bellows of the type which is expandable and contractable to vary its internal volume, said bellows being constructed from a single corrugated tube uncut along its length, the corrugations of said tube forming a series of annular folds, the portions of each of said folds adjacent its inner and outer perimeters being disposed parallel to and in contact with the next adjacent fold, the portion of each of said folds intermediate its inner and outer perimeters forming an ogee in cross section and being more flexible than the portions thereof adjacent its inner and outer perimeters.

2. A bellows as claimed in claim 1 wherein the inner and outer perimeters of each of said folds are cold hardened.

3. A bellows of the type which is expandable and contractable to vary its internal volume, said bellows being constructed from a single corrugated tube uncut along its length, the corrugations thereof comprising a series of normally laterally extending annular folds, each of said folds being cold hardened at their inner and outer perimeters such that each of said folds is normally flat in configuration and in contact with their next adjacent folds throughout their width when said bellows is in its fully contracted state and each of said folds forms an ogee when said bellows is expanded.

References Cited

UNITED STATES PATENTS

| | | | |
|---|---|---|---|
| 975,519 | 11/1910 | Fulton | 92—34 |
| 1,270,402 | 6/1918 | Fulton | 29—454 |
| 1,526,015 | 2/1925 | Sanner | 92—45 X |
| 1,659,038 | 2/1928 | Mallory | 92—34 |
| 2,341,556 | 2/1944 | Joy | 92—34 X |
| 2,534,123 | 12/1950 | Hasselhorn | 92—45 X |
| 3,040,426 | 6/1962 | Hamren | 29—423 |

FOREIGN PATENTS 558,342   5/1923   France.

MARTIN P. SCHWADRON, *Primary Examiner.*

SAMUEL LEVINE, *Examiner.*

I. C. COHEN, *Assistant Examiner.*